Dec. 4, 1923.                                          1,476,167
H. R. MITCHELL
SIGNALING MOTOR TEMPERATURE INDICATOR
Filed June 12, 1922
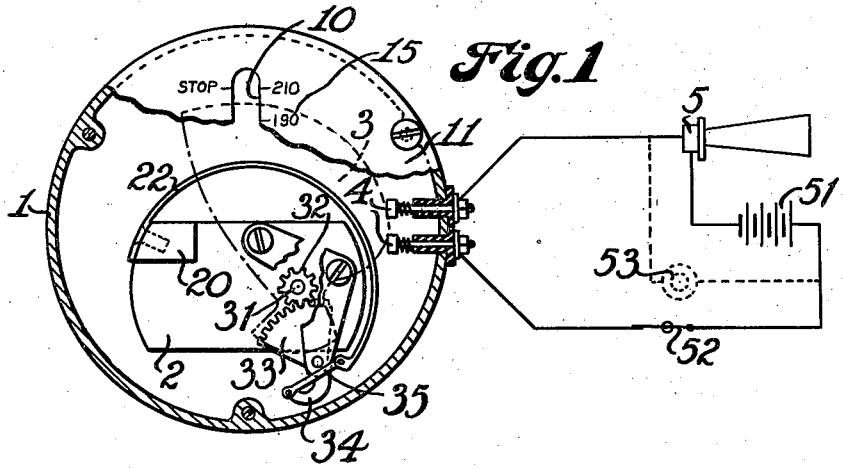
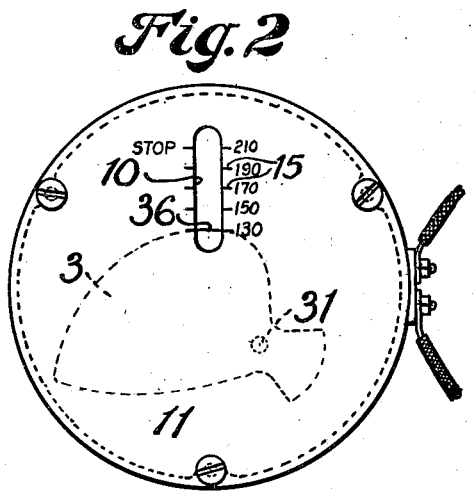
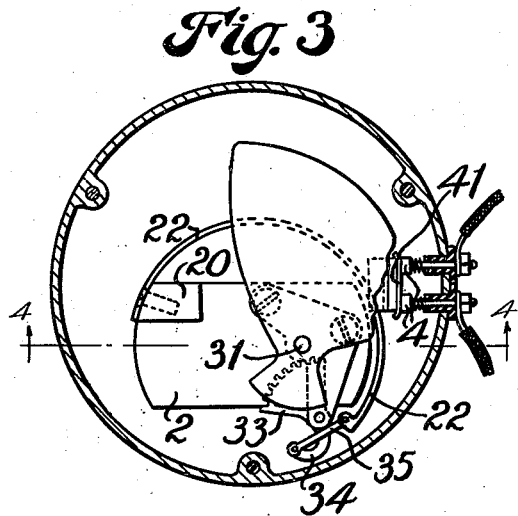
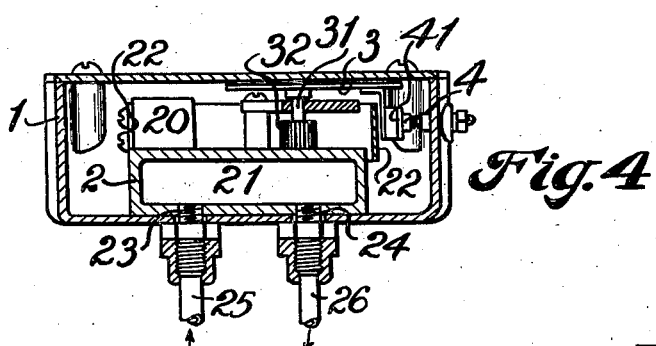
Inventor
Harry R. Mitchell
By H. L. & S. L. Reynolds
Attorneys Patented Dec. 4, 1923.

1,476,167

UNITED STATES PATENT OFFICE.

HARRY R. MITCHELL, OF SEATTLE, WASHINGTON, ASSIGNOR TO MITCHELL PRODUCTS COMPANY, OF SEATTLE, WASHINGTON, A CORPORATION OF WASHINGTON.

SIGNALING MOTOR-TEMPERATURE INDICATOR.

Application filed June 12, 1922. Serial No. 567,573.

*To all whom it may concern:*

Be it known that I, HARRY R. MITCHELL, a citizen of the United States of America, and resident of the city of Seattle, in the county of King and State of Washington, have invented certain new and useful Improvements in Signaling Motor-Temperature Indicators, of which the following is a specification.

My invention relates to a motor temperature indicator and has for its principal object the provision both of a visual signal and an audible warning signal, the former operating at all temperatures of the motor and the latter operating only at a predetermined temperature, as, for instance, when the motor is overheated.

Another object of my invention is to provide thermostatic mechanism for controlling a motor temperature indicator, which mechanism is controlled by the temperature of the water in the engine's water circulating system, without contact of the water or steam directly with the indicating mechanism.

A further object is to provide a thermostatically controlled oscillatable indicator in combination with a slotted casing, the edge of the indicator being so curved that it will appear to rise regularly behind the slot as it moves under the influence of a regular rise in temperature, and whereby its upper or forward edge will extend substantially horizontally across the slot.

Another object is to provide a simple and compact arrangement of thermostatic control elements together with a visible and an audible signal, whereby the visible signal and the thermostatic control elements may be mounted on the dash of an automobile or at some other suitable point.

My invention comprises those novel parts and combinations thereof which are shown in a preferred embodiment in the accompanying drawings, described in the specification and particularly defined by the claims terminating the same.

Figure 1 is a view partly in elevation and partly in section showing my thermostatic control means and indicating diagrammatically, the audible signal.

Figure 2 is an elevation of the device as it would appear upon the dash of a car.

Figure 3 is an elevation of the device with the cover removed.

Figure 4 is a section substantially on line 4—4 of Figure 3.

Within a casing 1, having a slot 10 in its cover 11, I secure a suitable thermostatic mechanism. Preferably this includes a chamber member 2 having an upward extension 20, both being of material which will readily conduct heat. A thermostatic bar 22 is secured by one end to the extension 20 and the chambered member 2. The thermostatic bar 22 is shown as curved and its opposite end lies adjacent the end of the chambered support 2 opposite from that which supports the bar 22.

This free end of the thermostatic bar is operatively connected in some suitable manner to a visual indicator 3. The indicator 3 is secured upon an oscillatable shaft 31, supported on the member 2, and which carries a pinion 32. A segment gear 33 meshes with the pinion 32, the gear 33 being pivoted upon the support 2 and having an arm 34 extending upon the opposite side of its pivot from the gear 33. A link 35 connects the arm 34 with the free end of the thermostatic bar 22.

The chamber 21 within the support 2 is closed except for an inlet opening 23 and an outlet opening 24. Within these openings are suitably connected conduits 25 and 26, the one leading from an upper portion of the water circulating system of the engine and the other leading to a lower portion of the circulating system. The chamber 21 is thus made a part of the water circulating system of the engine and will be heated by the water circulating therethrough. This water, however, can come in contact with no portion of the mechanism except the inner chamber 21. Thus there is not the possibility of damage to the mechanism which is present in such devices as employ a mercury-filled tube dipping within a chamber connected in the circulating system.

The visual indicator 3 normally lies to one side of the slot 10 and is not visible therethrough. Its pivot 31 is substantially in alinement with the slot 10 and beneath the end of the slot. Its upper or advanced edge 36 is so formed that when seen through the slot 10 it will always appear to extend substantially horizontally from side to side thereof, and with a regular increase in temperature it will rise regularly in the slot. Thus as the temperature of the water within the chamber 21 rises and its heat is conducted through the supports 2 and 20 to the thermostatic bar 22, thus causing movement of the indicator 3 to the right as seen in the drawings, the edge 36 of the indicator will appear to rise regularly with a corresponding rise in temperature. Indications shown at 15 in Figures 1 and 2 will serve to indicate to the driver the temperature of the water and thus the temperature of the engine.

In connection with an electric circuit which controls the horn 5 usually provided upon an automobile, or with another suitable circuit and audible signal therein, I provide means for closing a normally open gap therein, said means being operable by or through the visual indicator at some predetermined temperature, as for instance, just below the boiling point of water.

For this purpose I have shown in the casing 1 a pair of contact members 4 suitably insulated therefrom, one being connected with an audible signal, such as the electrically operated horn 5, and the circuit being completed through the battery 51 to the other contact 4, a switch 52 being provided if desired. The ordinary horn control circuit is shown in dotted lines in Figure 1 and includes the push button 53. Upon the visual indicator 3 I secure a bridging contact piece 41. This is adapted when an unduly high temperature is reached, to contact with the two contacts 4 thus to close the circuit which includes the horn 5 and in this manner to give audible warning that the engine is overheated.

It can be seen that the driver thus has both a visual signal which indicates the condition of his motor as regards temperature, and he also has an audible signal which will be sounded in case he fails to note the temperature indicated by the visual signal. The ordinary operation of the audible signal is in no wise affected by its use in connection with my device.

What I claim as my invention is:

1. A temperature indicator including a casing having an elongated graduated sight opening in one side thereof, a pivoted indicating plate within the casing and having an arcuate edge eccentric to the pivot axis, and thermally operated means within the casing for actuating the said plate to cause its arcuate edge to be advanced or retracted along said sight opening, said thermally operated means comprising a chambered part having an inlet thereto and an outlet therefrom, an expansible element disposed exteriorly of said part and within the zone of heat radiated therefrom, said element having a free end and connections between the said free end of the said element and the indicating plate.

2. In combination, a support, means for heating said support in accordance with engine temperatures, a thermostatic bar secured thereto by one end and curved to partially enclose said support and to lie almost wholly within the zone of heat radiated therefrom, an oscillatable shaft journaled upon said support, a visual indicator upon said shaft, a pinion secured upon said shaft, and a segment gear operatively connected to the free end of said thermostatic bar and meshing with said pinion.

3. In combination a supporting member interiorly chambered and having an inlet thereto and an outlet therefrom adapted to be connected to the water circulating system of an engine, a thermostatic bar of arcuate formation one end of which is secured to said support, said bar extending partially around said support and in proximity thereto so as to lie within the zone of heat radiated therefrom, a casing within which said support is located, said casing having a sight opening formed therein, a movable member disposed in proximity to said sight opening and mounted to be progressed therealong when it is moved and connections between said member and the thermostatic bar for moving said member as said thermostatic bar is moved under fluctuations of temperature.

4. In combination a casing having an elongated sight opening formed therein, a member pivoted in juxtaposition to said sight opening and of such a shape as to be progressed therealong when moved about its pivot, a chambered support within the casing, means for conducting a fluid through said chambered support, an arcuate thermostatic bar secured at one end to said support and extending partially therearound, a rack and pinion mechanism meshing with the pivot of the movable member and a link connection between the thermostatic bar and the rack and pinion mechanism.

Signed at Seattle, King county, Washington this 19th day of May 1922.

HARRY R. MITCHELL.